April 26, 1932.  P. HANSEN  1,855,673
COMPRESSOR PLANT
Filed April 8, 1929
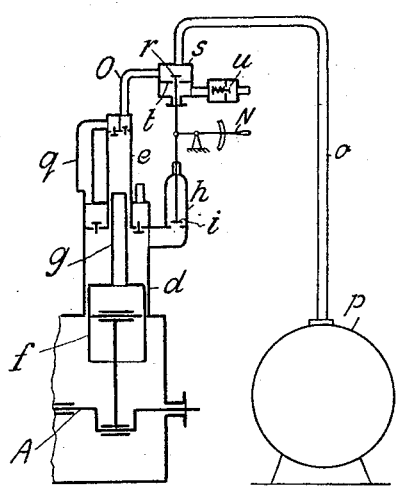
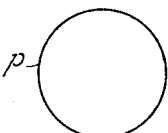
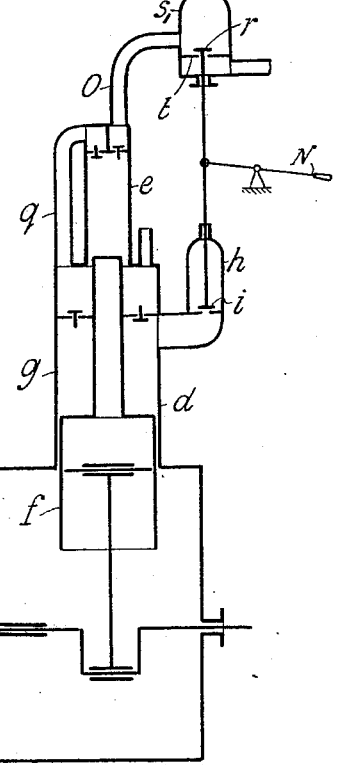
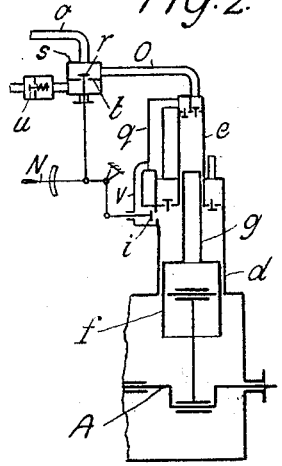
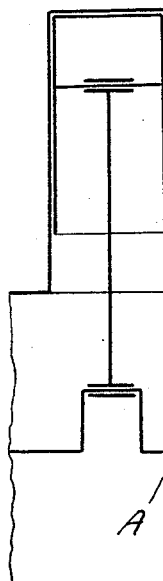
P. Hansen
INVENTOR
By: Marks Clerk
Attys.

Patented Apr. 26, 1932

1,855,673

UNITED STATES PATENT OFFICE

PAUL HANSEN, OF COPENHAGEN, DENMARK

COMPRESSOR PLANT

Application filed April 8, 1929, Serial No. 353,614, and in Denmark May 11, 1928.

The present invention relates to devices for operating the starting compressors driven by the auxiliary motors of a ship. "Auxiliary motor" means here a combustion motor which drives through direct coupling or through a suitable gear an electric dynamo or generator, the current of which is utilized for the operation of the various pumps and winches of the motor ship besides for lighting, heating, etc. An auxiliary motor plant therefore must run continuously running as long as the ship is in service on sea or in harbour. Besides driving the above machinery, the auxiliary motor also drives the air compressor serving to recharge the starting air reservoir or reservoirs of the main engines. In the known ship's motor plants where both the main and the auxiliary motor are combustion engines with solid injection, special compressor units have previously been used, which were only operated when the starting air reservoirs needed refilling. Such special units occupy, however, a great deal of space in the ship, and it is moreover no little trouble to have to put the compressor in and out of operation alternately. Instead hereof the starting air-compressor might be kept continually working either as a special unit or in combination with an auxiliary engine, the compressed air continually produced being allowed to blow off, as soon as the pressure in the starting air reservoir has reached its normal height. Units driven continually and blowing off the compressed air must, however, become very expensive in operation. In such units the compressor may be made inactive, e. g. by closing the suction pipe, but this method of operation has the drawback that accumulations of oil will occur and make the inactive valves and the piston rings seize and become filled with deposits of carbon. Continuous operation of starting air compressors has, therefore, generally not been employed, but instead thereof it has been preferred to combine the auxiliary motor of the ship's machinery with the starting air-compressor by a commonly known coupling or clutch. This method is to be preferred to a continuous operation with blowing off of the superfluous compressed air, but the discontinuous operation has the drawback that the auxiliary combustion motor must drive in certain periods both the compressor and the electric plant, while at other times the motor only drives the latter. The balance of the rotating and reciprocating parts is of the greatest importance to the electric plant, and this balance will inevitably be disturbed when the coupling or clutch of the compressor is connected or disconnected. Furthermore, the regularity of the governing is disturbed, and such torsional vibrations may occur that may give rise to breakage of the crank shaft of the auxiliary motor. The present invention has for its object to provide for continuous operation and yet to avoid the drawbacks connected to the known continually operating plants. According to the invention the compressor is driven continually by an auxiliary internal combustion engine, which at the same time serves to drive an electric dynamo or the like and running, therefore, with a chiefly constant speed, the compressor being only allowed to give full effect, when the pressure in the starting air reservoir or reservoirs is below the normal one, while when the said invention is normal the compressor is made to continue its work with a reduced effect, thereby that the clearance space of the compressor in a manner known per se is increased by addition of one or more expansion chambers. Normally the starting air compressor is combined with the auxiliary motor as a unit, so that the compressor is operated in inseparable combination with the auxiliary motor either by separate cranks of the main crank shaft of the auxiliary motor or in any other suitable way. Hereby is obtained that the cranks, connecting rods, pistons or the like of the compressor will form parts of the entire system of moving parts of the motor and, at the same time, an air current passes continually through the compressor. When the compression spaces of the compressor cylinders are increased by the addition of expansion chambers, a quite small air current must pass through the compressor to secure in the various stages a sufficiently great difference of pressure to make the valves work continually, and so that the piston rings and valves of the compressor are kept free from accumulations of lubricating oil, which might cause the oil to deposit carbon thereon. Such deposits increase the danger of explosion and seriously reduce the ability of the compressor for working at its full capacity. A compressor working continually in the said manner does not work uneconomically, as it consumes only a negligible energy in the periods where only a small air current passes through the compressor. If the compressor is a multi-stage one, expansion chambers may be employed in each of its stages, and the arrangement may be such that the expansion chambers are thrown in simultaneously, when the compressor is adjusted to work with a reduced yield. In a multi-stage compressor, the arrangement may also be such that only the low pressure cylinder—or in three-stage compressors, e. g. only the low and high cylinders—is provided with expansion chambers. Such a compressor is operated in such a way that the starting air reservoir is cut off when fully charged, and at the same time a blow-off valve and the communication with the expansion chambers are opened, so that the compressor continues working with only a small air current passing through the low pressure cylinder sucking an air volume corresponding only to a low suction pressure in the high pressure cylinder. Hereby is obtained that the compressor works at a pressure just high enough to overcome the resistances of valves and conduits and to give a weak air current through the compressor. In a compressor as above described such connection is normally provided between the shut-off valve of the air reservoir, the valve of the expansion chamber and the blow-off valve that the opening of the communication between the low pressure cylinder and the expansion chamber at the same time shuts the starting air reservoir and opens the blow-off valve. It is not necessary to build in a special expansion chamber in the compressor, it being possible to employ the intercooler between the low and high pressure cylinders as an expansion chamber and to insert a pipe leading from the low pressure volume to the cooler by-passing the pressure valves of the low pressure cylinder, which by-pass pipe may be closed by a regulating valve. In a compressor, where the cooler as described is employed as an expansion chamber, the arrangement may be carried out by means provided in combination with the pressure valve or valves, by which means the said valves may be kept open when the compressor works with reduced yield. In this case the cooler will also act as an expansion chamber. In the accompanying drawings those parts necessary for the understanding of the invention are represented. Fig. 1 is a sectional elevation of a constructional form of a compressor driven continually by an auxiliary combustion motor, Figs. 2 and 3 show two other constructional forms of the compressor. In the constructional example shown in Fig. 1, the crank shaft A of the auxiliary motor has to drive the continually working compressor serving to recharge the starting air reservoir $p$ of the chief motor plant (not shown), and the said compressor is, therefore practically so arranged as to be driven directly by an extra crank on the crank shaft of the auxiliary motor. The compressor is shown as a two stage compressor having a low pressure cylinder $d$ and a high pressure cylinder $e$. In the cylinders works a differential piston consisting of a low pressure piston $f$ and a high pressure piston $g$. The low pressure cylinder $d$ is provided with an expansion chamber $h$, which may be connected to or disconnected from the clearance space of the low pressure cylinder $d$ by a valve $i$, while the high pressure cylinder $e$ has no such chamber. The communication between low and high pressure takes place through the low pressure cooler $q$. The pipe O, $o$ leading from the high pressure cylinder $e$ to the starting air reservoir $p$ is provided with a valve arrangement $r, s, t, u$. This arrangement comprises a valve $r$ having a valve seat both on its upward and on its downward side. The valve $r$ may bear against the seat $s$ so as to close the passage to the last part of the pipe at the entrance of the pipe $o$. At the same time it opens connections from the pipe O to the atmosphere. In its other end position the valve $r$ bears against the seat $t$, so that the compressor communicates through the pipe O, $o$ with the starting air reservoir, the blow-off opening being in this case shut. The above described valve arrangement comprises besides the valve $r$ and the valve seats $s, t$ a spring-loaded check valve $u$ serving to regulate the blow-off pressure. In combination with the starting air reservoir $p$ or the pipe $o$ a nonreturn valve (not shown in Fig. 1) may be provided for, which prevents the return of the compressed air through the pipe $o$. Between the valve $r$ and the valve $i$ cutting-off the expansion chamber $h$ there is inserted a suitable rod connection provided with a hand adjustment N, so that the cutting off of the expansion chamber $h$ by means of the hand adjusting means N makes at the same time the valve $r$ move down into its lowermost position in which it bears against the seat $t$. In this position the valve $r$ has opened the communication from the compressor through the pipe O, $o$ to the starting air reservoir $p$. When, however, the valve $r$ is moved to its upper position, the valve $i$ opens the communication between the low pressure cylinder $d$ and the expansion chamber $h$, at the same time as the pipe O is cut off from the pipe $o$ and in return it is made to communicate with the atmosphere through the check valve $u$. The compressor shown in Fig. 1 acts as follows: When the compressor works at full yield, the valve $i$ is closed, so that at each piston stroke the low pressure cylinder $d$ sucks in virtually its full volume of air which after compression in the low pressure cylinder, passes through the intercooler $q$ to the high pressure cylinder $e$, where it is compressed to a pressure somewhat above that of the starting air reservoir. As simultaneously the valve $r$ bears against its lower seat $t$, the air passes directly through the pipe O, $o$ to the reservoir $p$. The latter being charged to normal pressure, the hand regulator N is adjusted so as to open the valve $i$ and at the same time the valve $r$ is seated on its upper seat $s$. Thus the pipe O is brought into communication with the atmosphere, the expansion chamber $h$ being at the same time opened, so that the low pressure cylinder $d$ sucks in a smaller volume of air which is compressed during the upward stroke of the piston $f$ and delivered to the high pressure cylinder $o$ through the intercooler $q$. The pressure in the pipe O being blown off, the high pressure cylinder cannot compress the air more than necessary to overcome the resistances of valves and pipings and the like. The blow-off pressure being adjusted by the regulating valve $u$. The modified constructional form of the compressor shown in Fig. 2 corresponds partly to that shown in Fig. 1 with the exception that the expansion chamber $h$ in Fig. 1 has been omitted and replaced by the air coil of the low pressure cooler $q$. As will appear from Fig. 2, the low pressure cylinder $d$ is provided with a by-pass pipe $v$ containing a regulating valve I, so that the low pressure cylinder $d$ may be put into direct communication with the cooler $q$ by-passing the pressure valves of the low pressure cylinder. The cooler $q$ in this way may be employed as an expansion chamber in combination with the low pressure cylinder, when the compressor is required to work with reduced yielding. When the by-pass pipe $v$ is shut by closing the valve I the compressor gives full yield. A compressor according to Fig. 2, where the cooler may be employed as an expansion chamber for the low pressure cylinder $d$, may also be so arranged that instead of the by-pass pipe $v$ means may be provided, by which the pressure valve or valves of the low pressure cylinder may be kept open, so that the cooler communicates through the open pressure valves with the low pressure cylinder and acts as an expansion chamber. In the compressor according to Fig. 2, a valve arrangement $r, s, t, u$ similar to that shown in Fig. 1 may be used, and between the blow-off valve $r$ and the valve I Fig. 2, cutting off the expansion chamber, a rod and link connection or its equivalent may be inserted, which may be connected with the hand adjusting device N, so that the pressure in the pipe O may be blown off automatically as soon as the expansion chamber is thrown in by opening the valve I. Fig. 3 shows a construction similar to that of Fig. 1 in which the valve "$r$", however, only coacts with the seat $t$. $s_1$ indicates the valve housing to which the pipes O and $o$ are connected. The pipe $o$ leading to the reservoir $p$ is provided with a non-return valve $w$, which prevents the return of the compressed air through the pipe and thus replaces the valve $r, s$ of Figs. 1 and 2, serving to close the pipe $o$. By means of the hand lever N the valves $r$ and $i$ are opened simultaneously in a corresponding manner as according to Figs. 1 and 2.

I claim:

1. The combination of a stage compressor, an air reservoir connected with the compressor, an engine continuously driving the compressor, an expansion chamber connected with the compressor, a valve interposed between the expansion chamber and compressor, a shut off valve interposed between the compressor and the reservoir, a relief valve for the compressor, and means connecting the first and second mentioned valves whereby communication between the compressor and the reservoir is cut off simultaneously with the opening of communication between the compressor and expansion chamber.

2. The combination as claimed in claim 1, characterized in that the compressor includes a high pressure cylinder connected with the reservoir and that the shut off valve and relief valve are located in the connection between the high pressure cylinder and the reservoir, the shut off valve acting in one position to close communication between the high pressure cylinder and the reservoir and to open communication between the cylinder and the relief valve and in the other position to close communication between the high pressure cylinder and the relief valve and to open communication between the cylinder and the reservoir.

3. The combination of a stage compressor, an air reservoir connected with the compressor, an engine continuously driving the compressor, an expansion chamber connected with the compressor, a valve interposed between the expansion chamber and compressor, a relief valve for the compressor, and means connecting the two said valves, whereby the relief valve is opened simultaneously with the opening of communication between the compressor and expansion chamber, and is also closed simultaneously with the cutting off of said communication.

In testimony whereof I affix my signature.

PAUL HANSEN.